United States Patent
Okajima (10) Patent No.: US 12,404,658 B2
(45) Date of Patent: Sep. 2, 2025

(54) WORK MACHINE AND METHOD FOR CALCULATING DEGREE OF INCLINATION OF WORK MACHINE

(71) Applicant: KOMATSU LTD., Tokyo (JP)

(72) Inventor: Kazumichi Okajima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 176 days.

(21) Appl. No.: 18/280,753

(22) PCT Filed: Feb. 2, 2022

(86) PCT No.: PCT/JP2022/003995
§ 371 (c)(1),
(2) Date: Sep. 7, 2023

(87) PCT Pub. No.: WO2022/190718
PCT Pub. Date: Sep. 15, 2022

(65) Prior Publication Data
US 2024/0159018 A1    May 16, 2024

(30) Foreign Application Priority Data
Mar. 12, 2021    (JP) .................. 2021-040240

(51) Int. Cl.
| | |
|---|---|
| *E02F 9/24* | (2006.01) |
| *E02F 9/16* | (2006.01) |
| *E02F 9/20* | (2006.01) |
| *E02F 9/26* | (2006.01) |

(Continued)

(52) U.S. Cl.
CPC .............. *E02F 9/24* (2013.01); *E02F 9/166* (2013.01); *E02F 9/2033* (2013.01); *E02F 9/26* (2013.01); *G01C 9/18* (2013.01); *E02F 3/32* (2013.01)

(58) Field of Classification Search
CPC ... E02F 3/32; E02F 9/163; E02F 9/166; E02F 9/2033; E02F 9/24; E02F 9/26; E02F 9/264; G01C 9/18
See application file for complete search history.

(56) References Cited

U.S. PATENT DOCUMENTS

| | | | |
|---|---|---|---|
| 2003/0001750 A1* | 1/2003 | Ishimoto | G06F 3/048 340/425.5 |
| 2009/0014930 A1* | 1/2009 | Kuzukawa | F16F 13/10 267/140.13 |

(Continued)

FOREIGN PATENT DOCUMENTS

| | | |
|---|---|---|
| JP | H06-17451 A | 1/1994 |
| JP | H07-207711 A | 8/1995 |
| JP | 2001-323510 A | 11/2001 |

(Continued)

*Primary Examiner* — Tyler J Lee
(74) *Attorney, Agent, or Firm* — Faegre Drinker Biddle & Reath LLP (57) ABSTRACT

A work machine includes a body, a work implement, and a controller. The body includes a frame to which the work implement is attached, an operator's cab, and a plurality of liquid-sealed mounts that are installed at different positions of the frame and support the operator's cab. At least one of the plurality of liquid-sealed mounts includes a sensor that detects a liquid pressure of a sealed liquid. The controller calculates an inclination degree of the work machine with respect to a horizontal plane based on a result of the detection by the sensor.

10 Claims, 9 Drawing Sheets

(51) Int. Cl.
*G01C 9/18* (2006.01)
*E02F 3/32* (2006.01)

(56) References Cited

U.S. PATENT DOCUMENTS

2019/0285093 A1* 9/2019 Muraoka ................ E02F 9/123
2021/0189696 A1* 6/2021 Hogan .................... E02F 3/20

FOREIGN PATENT DOCUMENTS

| JP | 2004-353771 A | 12/2004 |
| JP | 2007-186953 A | 7/2007 |
| JP | 2013-238097 A | 11/2013 |
| JP | 2018-48511 A | 3/2018 |
| JP | 2019-2242 A | 1/2019 |

* cited by examiner

WORK MACHINE AND METHOD FOR CALCULATING DEGREE OF INCLINATION OF WORK MACHINE

TECHNICAL FIELD

The present disclosure relates to a work machine and a work machine inclination degree calculation method.

BACKGROUND ART

Conventionally, a work machine including a work implement is known. For example, Japanese Patent Laying-Open No. H07-207711 (PTL 1) discloses a hydraulic excavator including an overturning prevention device as the work machine. Each detection signal from boom angle detection means, dipper stick angle detection means, revolving angle detection means, and inclination angle detection means is input to a controller of the overturning prevention device. The controller generates an alarm, stops an operation of a boom and a dipper stick, and stops a turning operation before a risk of overturning is generated according to a revolving operation of the boom and the dipper stick and the revolving operation of an upper revolving unit. An inclination angle sensor that detects an inclination angle of a machine body with respect to a horizontal plane is used as the inclination angle detector.

CITATION LIST

Patent Literature

PTL 1: Japanese Patent Laying-Open No. H07-207711

SUMMARY OF INVENTION

Technical Problem

In PTL 1, the inclination angle sensor detects the inclination angle of the horizontal plane of the machine body of the work machine. Thus, the inclination angle sensor of PTL 1 is required to have high accuracy and durability.

The present disclosure provides a work machine and a work machine inclination degree calculation method capable of accurately determining the inclination degree of the work machine required to have durability with respect to the horizontal plane.

Solution to Problem

According to one aspect of the present disclosure, a work machine includes a body, a work implement, and a controller. The body includes a frame to which the work implement is attached, an operator's cab, and a plurality of liquid-sealed mounts that are installed at different positions of the frame and support the operator's cab. At least one of the plurality of liquid-sealed mounts includes a sensor that detects a liquid pressure of a sealed liquid. The controller calculates an inclination degree of the work machine with respect to a horizontal plane based on a result of the detection by the sensor.

According to another aspect of the present disclosure, a body of a work machine includes a frame to which a work implement is attached, an operator's cab, and a plurality of liquid-sealed mounts that are installed at different positions of the frame and support the operator's cab. A method for calculating an inclination degree of a work machine includes: detecting a liquid pressure of a liquid sealed in at least one of the plurality of liquid-sealed mounts; and calculating, by a controller of the work machine, an inclination degree of the work machine with respect to a horizontal plane based on a result of the detection.

Advantageous Effects of Invention

According to the present disclosure, the inclination degree of the work machine with respect to the horizontal plane can be accurately determined.

DESCRIPTION OF EMBODIMENTS

Hereinafter, an embodiment will be described with reference to the drawings. It is planned from the beginning that structures in the embodiment are used while combined as appropriate. Some components may not be used.

In the following description, a hydraulic excavator will be described as an example of the work machine. However, the work machine is not limited to the hydraulic excavator, but is not particularly limited as long as it is the work machine having a work implement. In the following description, "upper", "lower", "front", "rear", "left" and "right" are terms based on an operator seated in a driver's seat.

Figure 1:
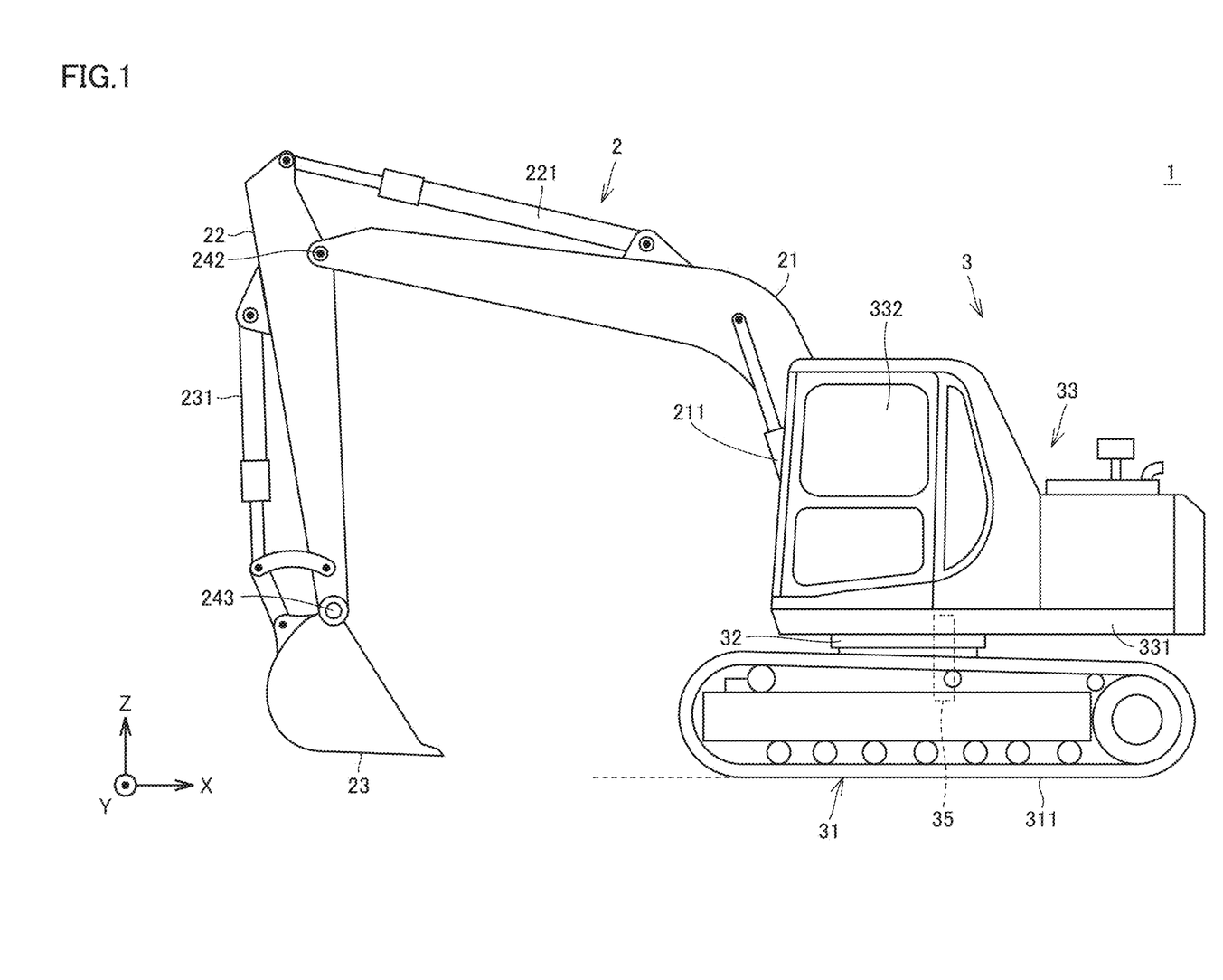
FIG. 1 is a side view schematically illustrating a configuration of the hydraulic excavator.

FIG. 1 is a side view schematically illustrating a configuration of the hydraulic excavator.

As illustrated in FIG. 1, a hydraulic excavator 1 includes a work implement 2 and a body 3. Body 3 includes a traveling unit 31, a swing circle 32, a revolving unit 33, and a hydraulic motor 35.

Traveling unit 31 includes a pair of right and left crawler belt apparatuses 311. Each of the pair of left and right crawler belt apparatuses 311 includes a crawler belt. When the pair of right and left crawler belts is rotationally driven, hydraulic excavator 1 self-propels.

Swing circle 32 is connected to hydraulic motor 35. Swing circle 32 is rotated by rotational driving of hydraulic motor 35.

Revolving unit 33 is installed on traveling unit 31 with swing circle 32 interposed therebetween. Revolving unit 33 turns with respect to traveling unit 31 as swing circle 32 rotates.

Revolving unit 33 includes a frame 331 to which work implement 2 is attached, an operator's cab 332, and a controller (see FIG. 8) that controls the operation of hydraulic excavator 1. For example, operator's cab 332 is disposed on a front left side (vehicle front side) of revolving unit 33. Hydraulic motor 35 is driven by hydraulic oil supplied from a hydraulic pressure source.

Work implement 2 is pivotally supported on the front side of revolving unit 33, for example, on the right side of operator's cab 332. Work implement 2 includes a boom 21, a dipper stick 22, a bucket 23, a boom cylinder 211, a dipper stick cylinder 221, and a bucket cylinder 231.

Boom 21 is attached to revolving unit 33. A proximal end portion of boom 21 is rotatably connected to revolving unit 33 by a boom foot pin (not illustrated).

Dipper stick 22 is attached to the distal end of boom 21. The proximal end portion of dipper stick 22 is rotatably connected to a distal end portion of boom 21 by a boom distal end pin 242.

Bucket 23 is attached to the distal end of dipper stick 22. Bucket 23 is rotatably connected to the distal end portion of dipper stick 22 by a dipper stick distal end pin 243.

Boom 21 can be driven by boom cylinder 211. Boom cylinder 211 is driven by the hydraulic oil supplied from a hydraulic pressure source (a hydraulic pump and an oil tank (not illustrated)). With this driving, boom 21 is vertically turnable about the boom foot pin (not illustrated) with respect to revolving unit 33.

Dipper stick 22 can be driven by dipper stick cylinder 221. By this driving, dipper stick 22 is vertically turnable with respect to boom 21 about boom distal end pin 242.

Bucket 23 can be driven by bucket cylinder 231. By this driving, bucket 23 is turnable in the vertical direction with respect to dipper stick 22 about dipper stick distal end pin 243. In this manner, work implement 2 can be driven.

Figure 2:
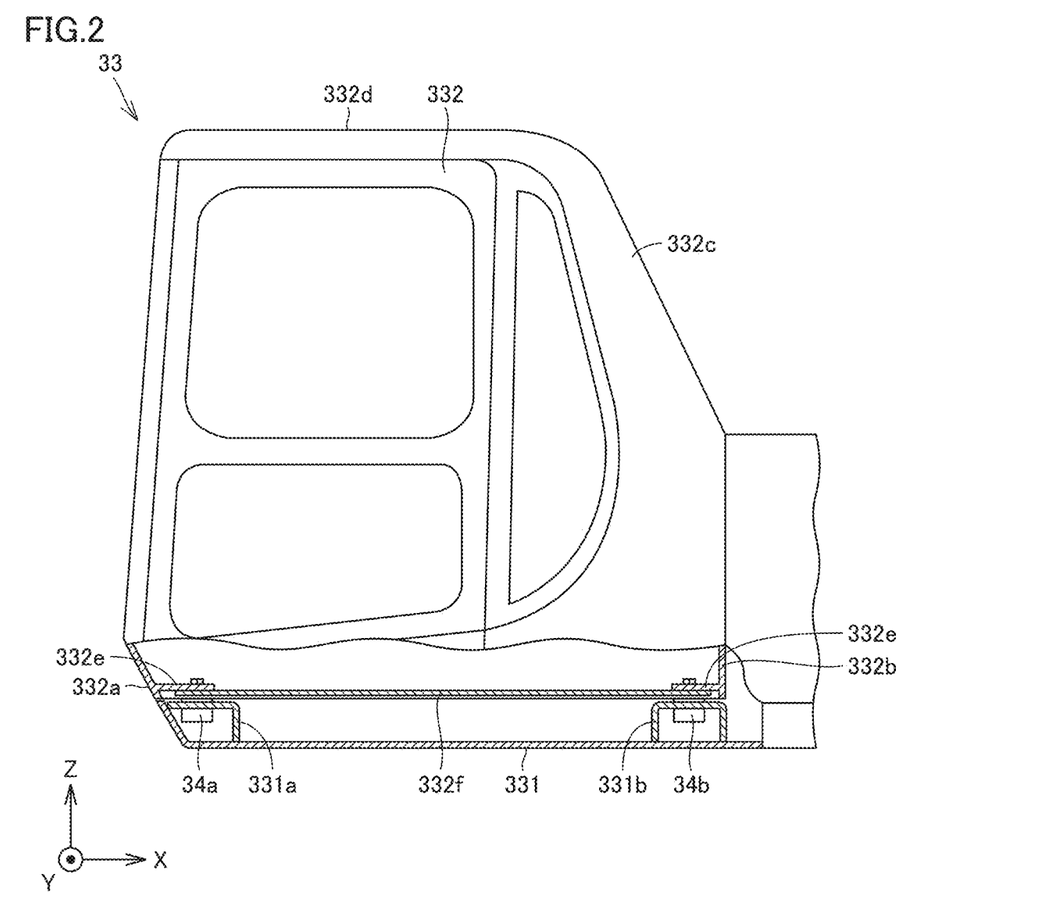
FIG. 2 is a view illustrating a configuration of a revolving unit.

FIG. 2 is a view illustrating a configuration of revolving unit 33.

As illustrated in FIG. 2, revolving unit 33 includes frame 331 and operator's cab 332 as described above. Revolving unit 33 further includes a plurality of liquid-sealed mounts 34a, 34b, . . . . The liquid-sealed mount is also referred to as "viscus mount" or "anti-vibration mount".

Frame 331 includes a frame body 331a and a beam 331b extending in the left-right direction.

Operator's cab 332 includes a front surface portion 332a, a rear surface portion 332b, a side surface portion 332c (only the left side is illustrated), and an upper surface portion 332d. Operator's cab 332 is surrounded by portions 332a, 332b, 332c, 332d. Operator's cab 332 is provided with a floor board bracket 332e on the lower end side. A floor board 332f forming the bottom of operator's cab 332 is attached to floor board bracket 332e.

Figure 6:
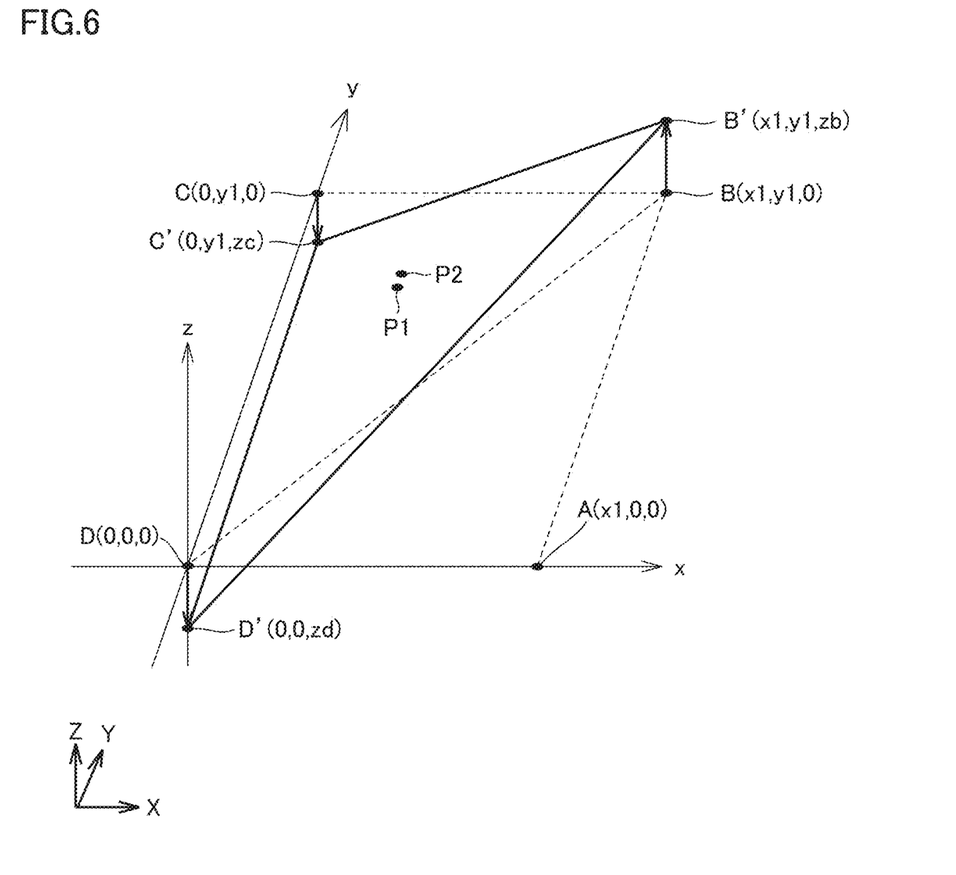
FIG. 6 is a view illustrating changes in deflection amounts (displacement amounts) of three liquid-sealed mounts.
Figure 8:
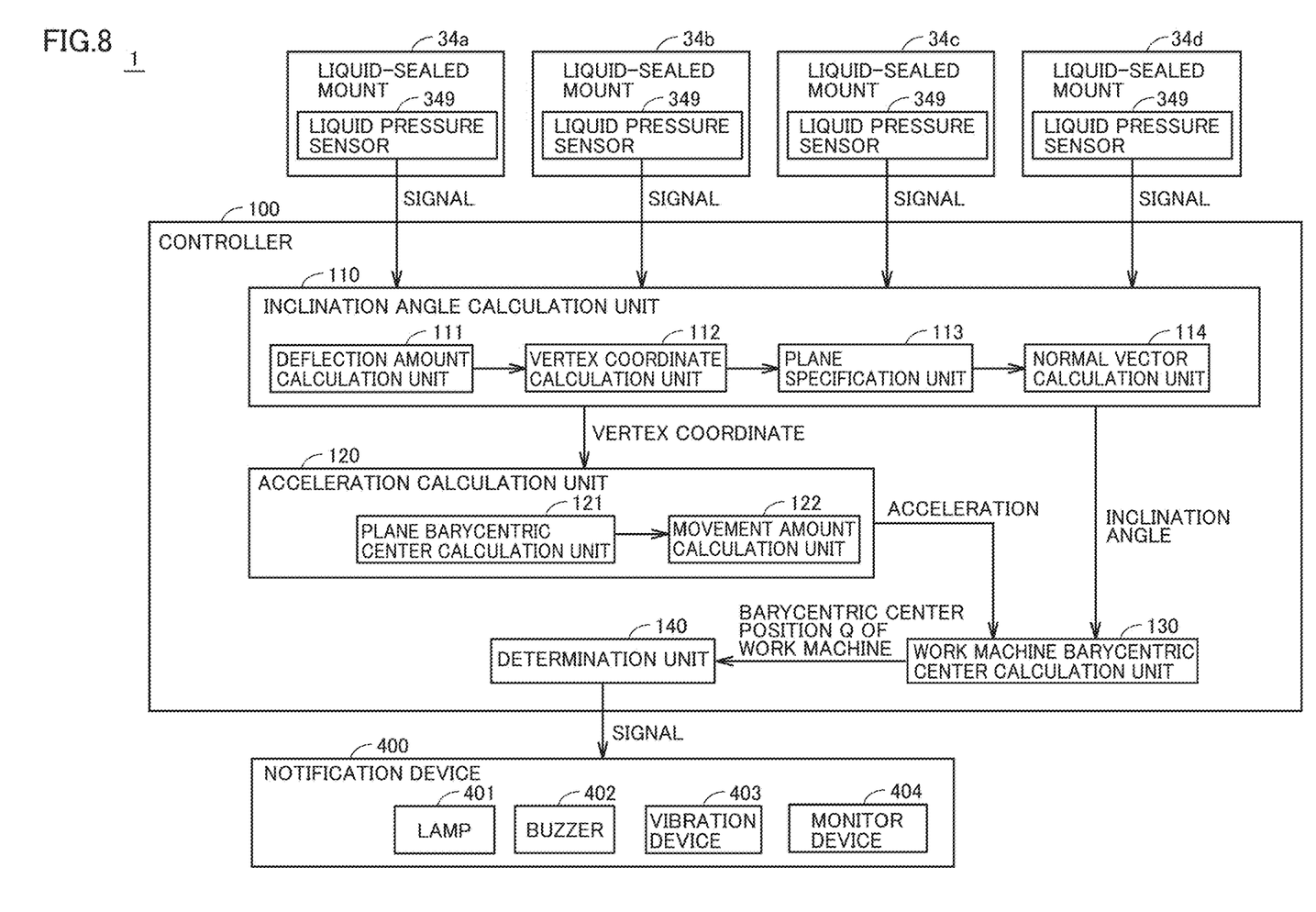
FIG. 8 is a block diagram illustrating a hardware configuration of the hydraulic excavator and a functional configuration of a controller of the hydraulic excavator.

The plurality of liquid-sealed mounts 34a, 34b, . . . are installed at different positions of frame 331 and support operator's cab 332. In this example, revolving unit 33 includes four liquid-sealed mounts 34a, 34b, 34c, 34d (FIGS. 6 and 8).

Liquid-sealed mount 34a is installed on the left side of the front portion of frame 331. Liquid-sealed mount 34b is installed on the left side of the rear portion of frame 331. Similarly, liquid-sealed mounts 34c, 34d (FIG. 6) are installed on the right side of the rear portion of frame 331 and the right side of the front portion of frame 331, respectively.

Liquid-sealed mounts 34a, 34d are disposed apart from each other in the left and right directions between frame body 331a and floor board 332f of operator's cab 332.

Liquid-sealed mounts 34b, 34c are disposed apart from each other in the left and right directions between beam 331b and floor board 332f.

In this manner, four liquid-sealed mounts 34a to 34d are installed at four corners of the lower portion of operator's cab 332. Liquid-sealed mounts 34a to 34d can prevent transmission of vibration of frame 331 to operator's cab 332.

Figure 3:
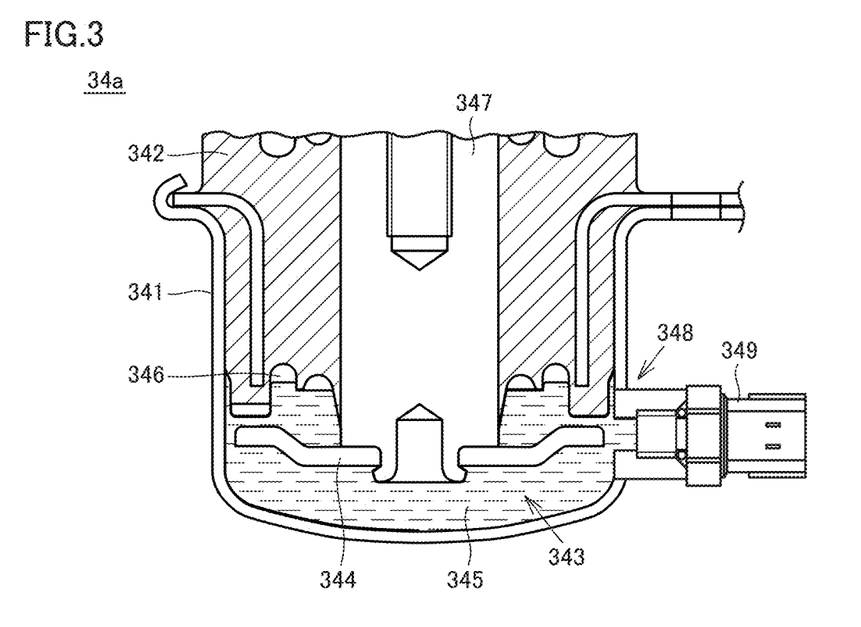
FIG. 3 is a view illustrating a main part of a liquid-sealed mount.

FIG. 3 is a view illustrating a main part of liquid-sealed mount 34a.

As illustrated in FIG. 3, liquid-sealed mount 34a includes a casing 341, an elastic body 342, a fluid chamber 343, a resistance plate 344, a shaft 347, and a liquid pressure sensor 349.

Casing 341 has an opening on the upper end side. Casing 341 includes a mounting port 348 in a side portion. Typically, mounting port 348 has a threaded groove.

Elastic body 342 is fixed to casing 341 or the like while the opening of casing 341 is closed. Elastic body 342 is typically rubber.

Shaft 347 is fixed to elastic body 342. Shaft 347 is formed in a columnar shape extending in the axial direction. Shaft 347 is disposed at the center of casing 341 by fixing an intermediate region in the axial direction to elastic body 342.

Casing 341, elastic body 342, and shaft 347 form a fluid chamber 343. A viscous liquid 345 and a compressed air 346 are sealed in fluid chamber 343. Viscous liquid 345 is typically silicon oil.

Resistance plate 344 is always immersed in viscous liquid 345 sealed in fluid chamber 343. Resistance plate 344 moves in viscous liquid 345 together with shaft 347 when elastic body 342 is elastically deformed. The movement generates resistance force (damping force) against the movement of shaft 347.

Liquid pressure sensor 349 is attached to mounting port 348 of casing 341. Typically, a thread groove is formed at an end of liquid pressure sensor 349. When the end of liquid pressure sensor 349 is screwed into mounting port 348 of casing 341, liquid pressure sensor 349 is fixed to casing 341.

Liquid pressure sensor 349 detects a liquid pressure of viscous liquid 345. Liquid pressure sensor 349 notifies controller 100 (FIG. 8) that controls the operation of hydraulic excavator 1 of a detection result. Liquid pressure sensor 349 periodically detects the liquid pressure and periodically transmits a detection result to controller 100. Liquid pressure sensor 349 notifies controller 100 of an electric signal that is the detection result. In this example, liquid pressure sensor 349 outputs a voltage value to controller 100.

As described above, liquid-sealed mount 34a includes liquid pressure sensor 349 that detects the liquid pressure of the viscous liquid sealed in liquid-sealed mount 34a and outputs the liquid pressure to controller 100.

Because liquid-sealed mounts 34b, 34c, 34d also have the same configuration as liquid-sealed mount 34a, liquid-sealed mounts 34b to 34d will not be described again here. Hereinafter, when liquid-sealed mounts 34a to 34d are not distinguished, any one of them is also referred to as "liquid-sealed mount 34".

Figure 4:
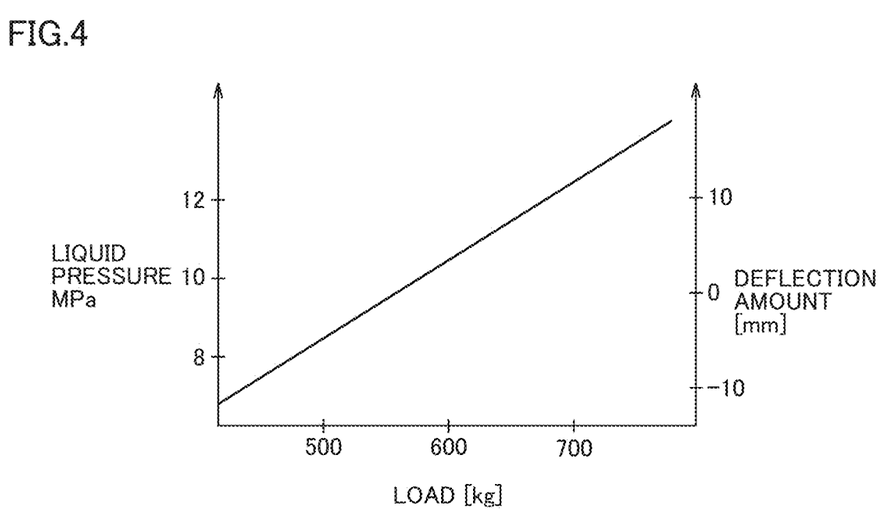
FIG. 4 is a view illustrating a characteristic of the liquid-sealed mount.

FIG. 4 is a view illustrating a characteristic of liquid-sealed mount 34.

As illustrated in FIG. 4, the liquid pressure of viscous liquid 345 and a deflection amount (deformation amount) of elastic body 342 are proportional to a load applied to liquid-sealed mount 34. As the load increases, the liquid pressure of viscous liquid 345 increases. When the load increases, the deflection amount of elastic body 342 increases.

Assuming that the liquid pressure is a variable p and the deflection amount is a function f(p), a relationship of f(p) =a×p+b holds between the liquid pressure and the deflection amount. Where a and b are coefficients. As described above, when the liquid pressure is known, the deflection amount of elastic body 342 is known.

Based on such a relationship between the liquid pressure of viscous liquid 345 and the deflection amount of elastic body 342, controller 100 of hydraulic excavator 1 calculates the deflection amount of elastic body 342 from the liquid pressure (detection result) of viscous liquid 345 detected by liquid pressure sensor 349.

Calculation of the inclination angle of hydraulic excavator 1 using the deflection amount of elastic body 342 will be described below.

Figure 5A:
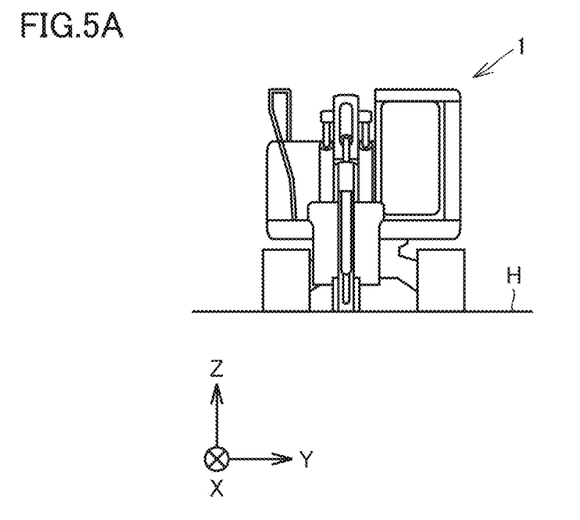
FIG. 5A is a view illustrating a state in which the hydraulic excavator is positioned on a horizontal plane.
Figure 5B:
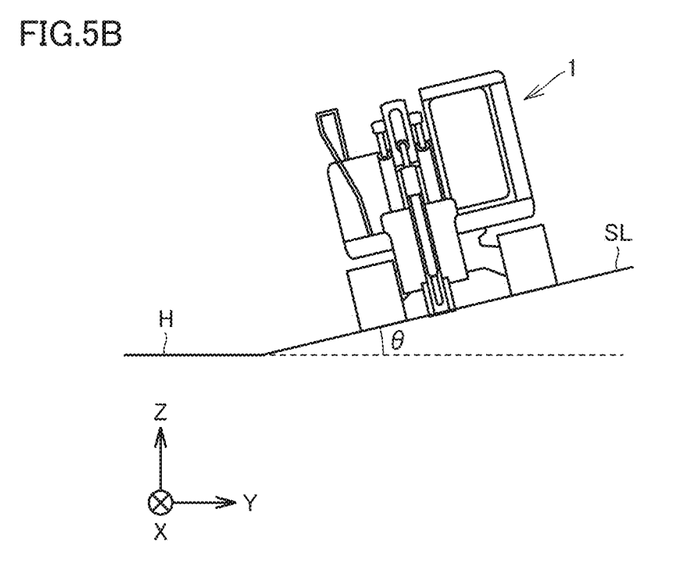
FIG. 5B is a view illustrating a state in which the hydraulic excavator is positioned on an inclined plane.

FIG. 5A is a view illustrating a state in which hydraulic excavator 1 is positioned on a horizontal plane H. FIG. 5B is a view illustrating a state in which hydraulic excavator 1 is positioned on an inclined plane SL. In FIG. 5B, the inclination angle of inclined plane SL with respect to the horizontal plane H is θ. Hereinafter, the case where hydraulic excavator 1 transitions from the state in FIG. 5A to the state in FIG. 5B will be described as an example.

In the following description, the case where inclination angle θ of hydraulic excavator 1 is calculated using three liquid-sealed mounts 34*b*, 34*c*, 34*d* among four liquid-sealed mounts 34*a* to 34*d* will be described as an example. Inclination angle θ is an example of an index indicating an "inclination degree" of hydraulic excavator 1.

FIG. 6 is a view illustrating changes in deflection amounts (displacement amounts) of three liquid-sealed mounts 34*b* to 34*d*. Hereinafter, the description will be given using an xyz-coordinate system (hereinafter, also referred to as "local coordinate system") set in hydraulic excavator 1 together with an XYZ-coordinate system (hereinafter, also referred to as "global coordinate system").

As illustrated in FIG. 6, points A, B, C, D schematically represent the positions of the upper end surfaces of elastic bodies 342 of four liquid-sealed mounts 34*a* to 34*d* when hydraulic excavator 1 is in the state of FIG. 5A. In the present example, for convenience of explanation, point D is set as an origin (0,0,0) of the local coordinate system. Hereinafter, the coordinates of points A, B, C in the xyz-coordinate system are (x1, 0, 0), (x1, y1, 0), and (0, y1, 0), respectively. Points B', C', D' schematically represent the positions of the upper end surfaces of elastic bodies 342 of three liquid-sealed mounts 34*b* to 34*d* when hydraulic excavator 1 is in the state of FIG. 5B.

When hydraulic excavator 1 transitions from the state in FIG. 5A to the state in FIG. 5B in a predetermined control cycle Tc (within one control cycle), the position of the upper end surface of elastic body 342 of liquid-sealed mount 34*b* changes from point B to point B'. Similarly, the position of the upper end surface of elastic body 342 of liquid-sealed mount 34*c* changes from point C to point C'. The position of the upper end surface of elastic body 342 of liquid-sealed mount 34*d* changes from point D to point D'.

As described above, the triangle constituted by the three points on the upper end surface of elastic body 342 changes from a triangle BCD to a triangle B'C'D'. That is, the coordinates of each vertex of the triangle (hereinafter, also referred to as "focused triangle") constituted by the three points change. The coordinates of points B', C', D' in the local coordinate system change in the z-axis direction, and for example, become (x1, y1, zb), (0, y1, zc), and (0, 0, zd), respectively.

Controller 100 calculates the inclination angle of triangle B'C'D' with respect to triangle BCD (xy-plane). In this example, triangle BCD is parallel to the XY-plane of the global coordinate system. The inclination angle of triangle BCD with respect to horizontal plane H is 0 degrees. As a result, controller 100 calculates the inclination angle of triangle B'C'D' with respect to horizontal plane H. Specifically, controller 100 calculates inclination angle θ of hydraulic excavator 1 with respect to the horizontal plane based on the direction of the normal vector of triangle B'C'D'.

In this manner, controller 100 calculates the inclination angle of hydraulic excavator 1 by relatively comparing the liquid pressures of three liquid-sealed mounts 34 at the corner of operator's cab 332. Therefore, the measurement error of inclination angle θ with respect to horizontal plane H of hydraulic excavator 1 is small, and influence of disturbance is hardly received during the calculation of inclination angle θ. For this reason, calibration of the sensor that is conventionally required is also unnecessary.

Specifically, operator's cab 332 is installed on revolving unit 33 with liquid-sealed mount 34 interposed therebetween. Revolving unit 33 is installed on traveling unit 31 with swing circle 32 interposed therebetween. Revolving unit 33 is inclined according to the inclination of traveling unit 31. Operator's cab 332 is inclined according to the inclination of revolving unit 33. The liquid pressure of each liquid-sealed mount 34 changes according to the inclination of operator's cab 332.

Accordingly, as described above, inclination angle θ of hydraulic excavator 1 can be obtained based on the liquid pressure of viscous liquid 345 of each liquid-sealed mount 34. In particular, even when an attitude of work implement 2, the load of bucket 23, the state of the oil in the oil passage (not illustrated), and the state of the additional option of the vehicle body change, operator's cab 332 does not tilt unless revolving unit 33 tilts, so that inclination angle θ can be calculated with high accuracy.

A point P1 in FIG. 6 indicates a barycentric center position of triangle BCD when hydraulic excavator 1 is in the state of FIG. 5A. A point P2 indicates the barycentric center position of triangle B'C'D' when hydraulic excavator 1 is in the state of FIG. 5B. As hydraulic excavator 1 transitions from the state in FIG. 5A to the state in FIG. 5B, the barycentric center position (hereinafter, also referred to as "barycentric center position P of triangle of interest") of the triangle of interest moves from point P1 to point P2. Controller 100 calculates magnitude and direction of the acceleration of the barycentric center movement from point P1 to point P2.

Although details will be described later, controller 100 determines the possibility of overturning of hydraulic excavator 1 using calculated inclination angle θ of hydraulic excavator 1 with respect to horizontal plane H, and the magnitude and direction of the acceleration of the movement of barycentric center position P of the triangle of interest. Barycentric center position P of the triangle of interest is a position in the local coordinate system.

Figure 7:
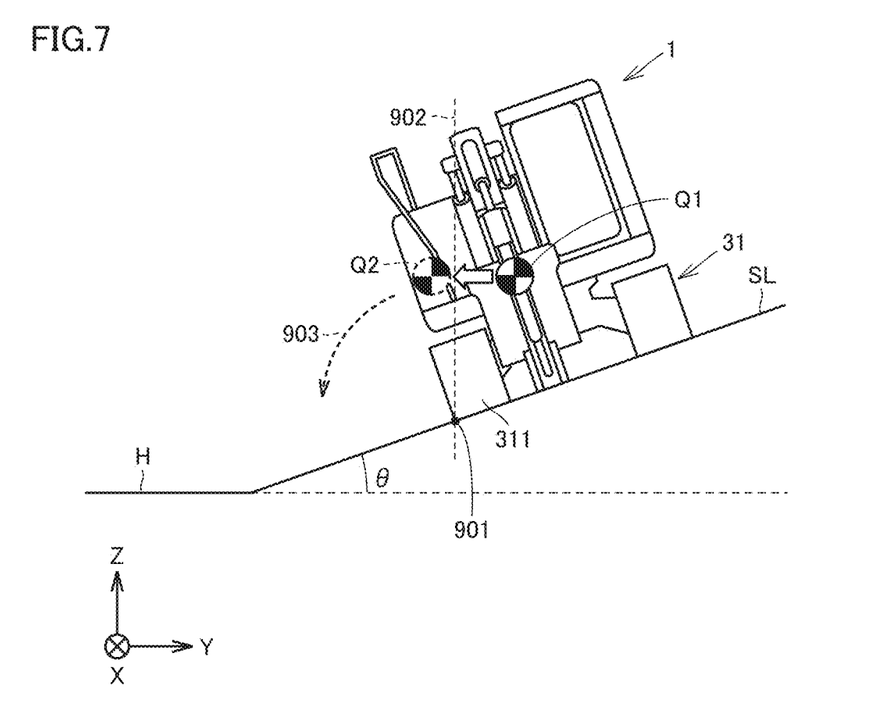
FIG. 7 is a view illustrating overturning of the hydraulic excavator.

FIG. 7 is a view illustrating the overturning of hydraulic excavator 1.

As illustrated in FIG. 7, a straight line 901 indicates an imaginary line (a straight line in the X-axis direction) of an end portion in the Y-axis negative direction in a portion where right crawler belt apparatus 311 is brought into contact with inclined plane SL. Because FIG. 7 is a front view of hydraulic excavator 1, straight line 901 is represented as a point. A plane 902 is a virtual plane orthogonal to horizontal plane H. Straight line 901 is a line on plane 902.

Similarly to FIG. 5B, hydraulic excavator 1 is located on inclined plane SL. The barycentric center position of hydraulic excavator 1 at this time (hereinafter, also referred to as "barycentric center position Q of work machine") is defined as a position Q1. In this state, for example, it is assumed that the operator revolves revolving unit 33 in the clockwise direction (Y-axis negative direction in FIG. 7) and raises work implement 2 and barycentric center position Q of work machine moves from position Q1 to position Q2. Barycentric center position Q of the work machine is a position in the XYZ-coordinate system.

In this case, barycentric center position Q of the work machine moves to a position Q2 on the opposite side of position Q1 with respect to plane 902. For this reason, hydraulic excavator 1 overturns in the direction of an arrow 903 with straight line 901 as the rotation axis.

In order to prevent the generation of the situation, hydraulic excavator 1 previously determines the possibility of the overturning of hydraulic excavator 1 (hazards, signs), and notifies the operator of the possibility of the overturning of hydraulic excavator 1. Hereinafter, the determination of the possibility of the overturning of hydraulic excavator 1 will be described in more detail.

FIG. 8 is a block diagram illustrating a hardware configuration of hydraulic excavator 1 and a functional configuration of controller 100 of hydraulic excavator 1.

As illustrated in FIG. 8, hydraulic excavator 1 includes four liquid-sealed mounts 34a to 34d, controller 100, and a notification device 400.

Liquid-sealed mounts 34a to 34d include liquid pressure sensor 349. As described above, liquid pressure sensor 349 detects the liquid pressure of viscous liquid 345 and notifies controller 100 of the detection result.

Notification device 400 includes a lamp 401, a buzzer 402, a vibration device 403, and a monitor device 404. For example, vibration device 403 is incorporated in an operation apparatus such as an operation lever. Notification device 400 may include at least one of lamp 401, buzzer 402, vibration device 403, and monitor device 404.

Controller 100 controls the overall operation of hydraulic excavator 1. Controller 100 is installed in body 3. Typically, controller 100 is installed in operator's cab 332.

Controller 100 includes an inclination angle calculation unit 110, an acceleration calculation unit 120, a work machine barycentric center calculation unit 130, and a determination unit 140. Inclination angle calculation unit 110 includes a deflection amount calculation unit 111, a vertex coordinate calculation unit 112, a plane specification unit 113, and a normal vector calculation unit 114. Acceleration calculation unit 120 includes a plane barycentric center calculation unit 121 and a movement amount calculation unit 122.

Inclination angle calculation unit 110 calculates inclination angle θ of hydraulic excavator 1 with respect to horizontal plane H. Inclination angle calculation unit 110 calculates the inclination angle for each control cycle Tc. Hereinafter, processing in inclination angle calculation unit 110 will be described.

Deflection amount calculation unit 111 calculates the deflection amounts of elastic bodies 342 of three liquid-sealed mounts 34 based on detection results of three predetermined liquid pressure sensors 349 among four liquid pressure sensors 349. In the example of FIG. 6, deflection amount calculation unit 111 calculates the deflection amount of each elastic body 342 of liquid-sealed mounts 34b, 34c, 34d. Deflection amount calculation unit 111 calculates the deflection amount of each elastic body 342 based on the relationship (FIG. 4) between the liquid pressure of viscous liquid 345 and the deflection amount of elastic body 342 described above.

Vertex coordinate calculation unit 112 calculates coordinates of three vertices in the local coordinate system of the above-described triangle of interest (see FIG. 6) based on the deflection amounts of three elastic bodies 342.

Based on the calculated coordinates of the three vertices, plane specification unit 113 identifies a plane including the three coordinates in the local coordinate system. Normal vector calculation unit 114 calculates a normal vector of the plane specified by plane specification unit 113.

Inclination angle calculation unit 110 calculates an inclination angle of hydraulic excavator 1 with respect to horizontal plane H based on the calculated normal vector. Inclination angle calculation unit 110 transmits information about the calculated inclination angle to work machine barycentric center calculation unit 130. Inclination angle calculation unit 110 sends the information about the coordinates of the three vertices calculated by vertex coordinate calculation unit 112 to acceleration calculation unit 120.

Acceleration calculation unit 120 calculates the magnitude and direction of the acceleration of the barycentric center movement of the above-described triangle of interest (see FIG. 6). Acceleration calculation unit 120 periodically (every control cycle Tc described above) calculates the magnitude and direction of the acceleration of the barycentric center movement of the triangle of interest.

Plane barycentric center calculation unit 121 periodically calculates barycentric center position P of the triangle of interest based on the coordinates of the three vertices. Movement amount calculation unit 122 periodically calculates the movement amount (change amount) of barycentric center position P of the triangle of interest based on the calculation result of plane barycentric center calculation unit 121.

Based on the movement amount calculated by movement amount calculation unit 122 and barycentric center position P of the triangle of interest calculated by plane barycentric center calculation unit 121, acceleration calculation unit 120 periodically calculates the magnitude and direction of the acceleration of the movement of barycentric center position P of the triangle of interest. Acceleration calculation unit 120 transmits the information about the magnitude and direction of the calculated acceleration to work machine barycentric center calculation unit 130.

Work machine barycentric center calculation unit 130 periodically calculates barycentric center position Q (see FIG. 7) of the work machine based on inclination angle θ, and the magnitude and direction of the acceleration. Work machine barycentric center calculation unit 130 transmits the information about calculated barycentric center position Q of the work machine to determination unit 140.

Determination unit 140 determines the possibility of the overturning of hydraulic excavator 1 based on barycentric center position Q of the work machine. Determination unit 140 causes notification device 400 to execute the notification based on the determination result. Specifically, determination unit 140 calculates an index value indicating the possibility of the overturning based on barycentric center position Q of the work machine. Determination unit 140 determines whether the index value exceeds a predetermined threshold. When determining that the index value exceeds the threshold, determination unit 140 transmits a predetermined signal (command) to notification device 400 in order to notify the operator of the warning.

The index value is represented as a difference between calculated barycentric center position Q of the work machine and a predetermined reference barycentric center position (default barycentric center position). As the index value, a component parallel to the XY-plane (horizontal plane H) in the XYZ-coordinate system described above can be mainly used among the differences.

The reference barycentric center position is a barycentric center position when hydraulic excavator 1 is located on horizontal plane H. The reference barycentric center position is a barycentric center position when revolving unit 33 does not revolve. The reference barycentric center position is a barycentric center position when work implement 2 is located at a predetermined position.

When receiving a signal notifying the warning from controller 100, notification device 400 notifies the operator of the warning. For example, lamp 401 blinks. Buzzer 402 sounds. Vibration device 403 vibrates. Monitor device 404 displays a warning screen on the screen.

The notification device issues the alarm in this manner, so that the operator can know the possibility of the overturning of hydraulic excavator 1. Therefore, when the operator performs an overturning avoidance operation, hydraulic excavator 1 can be prevented from overturning.

Controller 100 includes a processor (not illustrated) and a memory in which various programs are stored. The processor executes the program to implement inclination angle calculation unit 110, acceleration calculation unit 120, work machine barycentric center calculation unit 130, and determination unit 140. In addition, all or part of the processing in inclination angle calculation unit 110, acceleration calculation unit 120, work machine barycentric center calculation unit 130, and determination unit 140 may be implemented by a dedicated arithmetic circuit such as an application specific integrated circuit (ASIC).

Figure 9:
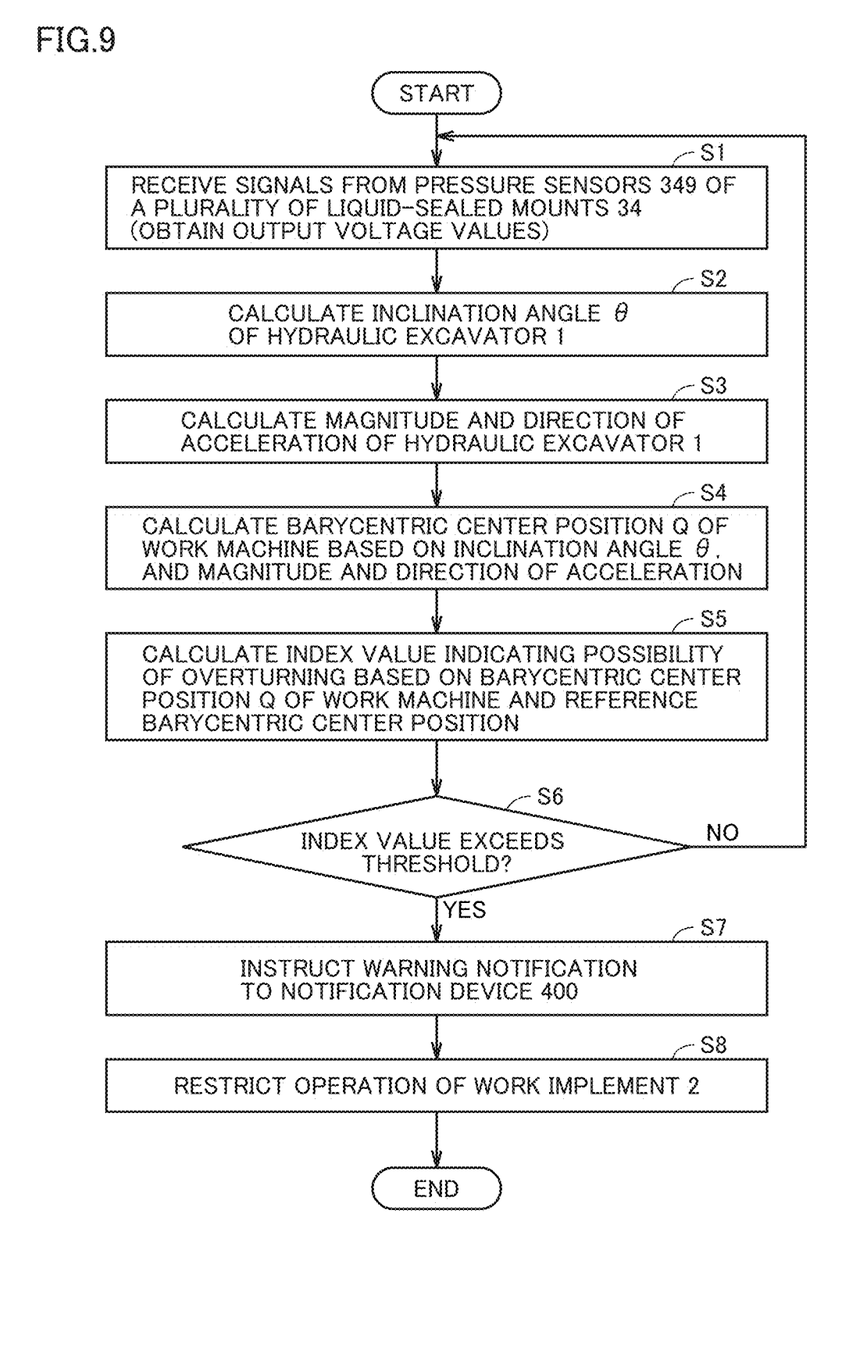
FIG. 9 is a flowchart illustrating a flow of processing of the controller.

FIG. 9 is a flowchart illustrating a flow of processing of controller 100. The following processing is executed for each control cycle Tc.

As illustrated in FIG. 9, in step S1, controller 100 receives the signals that are the detection result from liquid pressure sensors 349 of the plurality of liquid-sealed mounts 34. In step S2, controller 100 calculates inclination angle θ of hydraulic excavator 1 with respect to horizontal plane H based on the signals received from three liquid pressure sensors 349. In step S3, controller 100 calculates the magnitude and direction of the acceleration of hydraulic excavator 1 based on the movement of barycentric center position P of the triangle of interest.

In step S4, controller 100 calculates barycentric center position Q of the work machine based on the calculated inclination angle, and the calculated magnitude and direction of the acceleration. In step S5, controller 100 calculates the index value indicating the possibility of the overturning based on barycentric center position Q of the work machine and the reference barycentric center position. In step S6, controller 100 determines whether the calculated index value exceeds a predetermined threshold.

When determining that the index value exceeds the threshold (YES in step S6), controller 100 sends a warning notification instruction to notification device 400 in step S7. Thus, notification device 400 notifies the operator of the warning.

In step S8, controller 100 restricts the operation of work implement 2. For example, controller 100 restricts the movement of work implement 2 in the direction in which the possibility of the overturning exists regardless of the operator's operation. Thus, the possibility of the overturning of hydraulic excavator 1 can be reduced. When determining that the index value does not exceed the threshold (NO in step S6), controller 100 returns the processing to step S1. When next control cycle Tc arrives, controller 100 repeats the processing in and after step S1.

A part of the configuration of hydraulic excavator 1 described above is extracted as follows.

Hydraulic excavator 1 includes work implement 2, traveling unit 31, revolving unit 33 revolvably supported by traveling unit 31, and controller 100. Revolving unit 33 includes frame 331 to which work implement 2 is attached, operator's cab 332, and a plurality of liquid-sealed mounts 34 that are installed at different positions of frame 331 and support operator's cab 332. Each liquid-sealed mount 34 includes liquid pressure sensor 349 that detects the liquid pressure of viscous liquid 345 sealed within liquid-sealed mount 34. Controller 100 calculates inclination angle θ of hydraulic excavator 1 with respect to horizontal plane H based on the detection result of each liquid pressure sensor 349. According to such the configuration, as described above, inclination angle θ of hydraulic excavator 1 with respect to horizontal plane H can be accurately determined.

Hydraulic excavator 1 further includes notification device 400. Controller 100 determines the possibility of the overturning of hydraulic excavator 1 based on inclination angle θ. Controller 100 causes notification device 400 to execute the notification based on the determination result. According to such the configuration, the operator of hydraulic excavator 1 can know that the possibility of the overturning of hydraulic excavator 1.

Controller 100 further calculates the magnitude and direction of the acceleration of hydraulic excavator 1 based on the detection result by each liquid pressure sensor 349. Controller 100 determines the possibility of the overturning of hydraulic excavator 1 based on inclination angle θ, and the magnitude and direction of the acceleration. According to such the configuration, the possibility of the overturning of hydraulic excavator 1 can be accurately determined as compared with a configuration using only inclination angle θ.

Controller 100 further calculates barycentric center position Q of the work machine based on inclination angle θ, and the magnitude and direction of the acceleration. Controller 100 determines the possibility of the overturning of hydraulic excavator 1 based on barycentric center position Q of the work machine. When the possibility of the overturning is determined based on barycentric center position Q of the work machine of hydraulic excavator 1, the determination can be performed with high accuracy.

Controller 100 further calculates the index value indicating the possibility of the overturning of hydraulic excavator 1 based on barycentric center position Q of the work machine. When the index value exceeds the threshold, controller 100 causes notification device 400 to issue the warning notification.

When the index value exceeds the threshold, controller 100 restricts the operation of work implement 2. According to such the configuration, the possibility of the overturning of hydraulic excavator 1 can be further reduced.

Hydraulic excavator 1 includes at least three liquid-sealed mounts 34. Controller 100 calculates the displacement amount (deflection amount) from the reference value of liquid-sealed mount 34 for each of liquid-sealed mounts 34 based on the liquid pressure of viscous liquid 345 of three liquid-sealed mounts 34. Controller 100 calculates inclination angle θ based on the three displacement amounts. When the liquid pressure of viscous liquid 345 of three liquid-sealed mounts 34 is used, the above-described triangle of interest can be formed. Therefore, the controller 100 can calculate the inclination angle θ.

<Modifications>

(1) In the above description, controller 100 performs the processing using the detection results of liquid pressure sensors 349 of three liquid-sealed mounts 34b, 34c, 34d. However, the present invention is not limited thereto. Controller 100 may use the detection results of liquid pressure sensors 349 of any three liquid-sealed mounts 34 among four liquid-sealed mounts 34a to 34d.

(2) Focusing on a plurality of triangles, the inclination angle of each triangle of interest may be obtained, and the average value thereof may be used as inclination angle θ.

(3) Because controller 100 is configured to utilize the detection results of three liquid pressure sensors 349, one of four liquid-sealed mounts 34 may not include liquid pressure sensor 349.

(4) In the above description, determination unit 140 of controller 100 compares the index value with one threshold, and determines whether to send the predetermined signal to notification device 400. However, the present invention is not limited thereto, and determination unit 140 may compare with a plurality of thresholds (for example, Th2>Th1). In this case, when the index value exceeds threshold Th1, determination unit 140 transmits the first signal to notification device 400. When the index value exceeds threshold Th2, determination unit 140 transmits the second signal to notification device 400.

Notification device 400 makes a notification mode different between when the first signal is received and when the second signal is received. For example, when notification device 400 receives the second signal, the degree of warning is made greater than that when the first signal is received. According to such the configuration, the operator can know that the possibility of the overturning of hydraulic excavator 1 is increased.

(5) In the above description, the work machine is the hydraulic excavator. However, the present invention is not limited thereto, and any work machine including a work implement may be used. For example, the work machine may be a crawler dozer, a loader, or a grader. The work machine includes the body, the work implement, and controller 100. The body includes the frame to which the work implement is attached, the operator's cab, and the plurality of liquid-sealed mounts 34 that are installed at different positions of the frame and support the operator's cab.

(6) In the above description, it is assumed that the plurality of liquid pressure sensors exist, but one liquid pressure sensor can be used as long as the inclination degree is viewed. A liquid pressure standard value of one liquid pressure sensor is stored, and whether the rubber mount of the pressure sensor is compressed or pulled can be seen from the change from the liquid pressure standard value, and the inclination degree can be seen. Controller 100 can calculate the inclination degree of the work machine based on the change in liquid pressure from the liquid pressure standard value stored previously in the memory of controller 100.

The above embodiment is only by way of example, and the present invention is not limited to the above embodiment. The scope of the present invention is indicated by the claims, and it is intended that all modifications within the meaning and scope of the claims are included in the present invention.

REFERENCE SIGNS LIST

1: hydraulic excavator, 2: work implement, 3: body, 21: boom, 22: dipper stick, 23: bucket, 31: traveling unit, 32: swing circle, 33: revolving unit, 34a, 34b, 34c, 34d: liquid-sealed mount, 35: hydraulic motor, 100: controller, 110: inclination angle calculation unit, 120: acceleration calculation unit, 130: work machine barycentric center calculation unit, 140: determination unit, 211: boom cylinder, 221: dipper stick cylinder, 231: bucket cylinder, 242: boom distal end pin, 243: dipper stick distal end pin, 311: crawler belt apparatus, 331: frame, 331a: frame body, 331b: beam, 332: operator's cab, 332a: front surface portion, 332b: rear surface portion, 332c: side surface portion, 332d: upper surface portion, 332e: floor board bracket, 332f: floor 10 board, 341: casing, 342: elastic body, 343: fluid chamber, 344: resistance plate, 345: viscous liquid, 346: compressed air, 347: shaft, 348: mounting port, 349: liquid pressure sensor, 400: notification device, 901: straight line, 902: plane, H: horizontal plane, P: barycentric center position of triangle of interest, Q: barycentric center position of work machine, SL: inclined plane

The invention claimed is:

1. A work machine comprising:
a body;
a work implement; and
a controller,
wherein
the body includes a frame to which the work implement is attached, an operator's cab, and a plurality of liquid-sealed mounts that are installed at different positions of the frame and support the operator's cab,
at least one of the plurality of liquid-sealed mounts includes a sensor that detects a liquid pressure of a sealed liquid, and
the controller calculates an inclination degree of the work machine with respect to a horizontal plane based on a result of the detection by the sensor.

2. The work machine according to claim 1, wherein the inclination degree is an inclination angle.

3. The work machine according to claim 2, further comprising a notification device, wherein
the controller determines a possibility of overturning of the work machine based on the inclination angle, and
causes the notification device to execute notification based on a result of the determination.

4. The work machine according to claim 3, wherein
the controller further calculates magnitude and direction of acceleration of the work machine based on the result of the detection by the sensor, and
determines the possibility of the overturning of the work machine based on the inclination angle, and the magnitude and direction of the acceleration.

5. The work machine according to claim 4, wherein
the controller further calculates a barycentric center position of the work machine based on the inclination angle, and the magnitude and direction of the acceleration, and
determines the possibility of the overturning of the work machine based on the barycentric center position.

6. The work machine according to claim 5, wherein
the controller further calculates an index value indicating the possibility of the overturning based on the barycentric center position, and
causes the notification device to execute a warning notification when the index value exceeds a threshold.

7. The work machine according to claim 6, wherein the controller restricts an operation of the work implement when the index value exceeds the threshold.

8. The work machine according to claim 3, wherein
the work machine includes at least three of the liquid-sealed mounts, and
the controller calculates a displacement amount from a reference value of the liquid- sealed mount for each of the liquid-sealed mounts based on the liquid pressure of the three of the liquid-sealed mounts, and
calculates the inclination angle based on three of the displacement amounts.

9. The work machine according to claim 1, wherein
the work machine is a hydraulic excavator,
the body includes a traveling unit and a revolving unit revolvably supported by the traveling unit, and
the revolving unit includes the frame, the operator's cab, and the plurality of liquid-sealed mounts.

10. A method for calculating an inclination degree of a work machine, a body of the work machine including a frame to which a work implement is attached, an operator's cab, and a plurality of liquid-sealed mounts that are installed at different positions of the frame and support the operator's cab,
the method comprising:
detecting a liquid pressure of a liquid sealed in at least one of the plurality of liquid-sealed mounts; and
calculating, by a controller of the work machine, an inclination degree of the work machine with respect to a horizontal plane based on a result of the detection.

\* \* \* \* \*